United States Patent [19]

Reittu

[11] Patent Number: 5,335,689
[45] Date of Patent: Aug. 9, 1994

[54] FASTENING ARRANGEMENT BETWEEN THE CLOSING PIECE OR VALVE PIECE OF A SONDE BALLOON AND THE NECK OF THE SONDE BALLOON

[75] Inventor: Osmo Reittu, Espoo, Finland
[73] Assignee: Vaisala Oy, Finland
[21] Appl. No.: 70,273
[22] Filed: Jun. 1, 1993

[30] Foreign Application Priority Data

Jun. 3, 1992 [FI] Finland ................... 922558

[51] Int. Cl.$^5$ ............................... B64B 1/40
[52] U.S. Cl. ............................ 137/231; 446/222; 244/31; 244/127
[58] Field of Search .............. 137/223, 231; 446/222; 244/31, 33, 127

[56] References Cited

U.S. PATENT DOCUMENTS

| | | | |
|---|---|---|---|
| 1,478,757 | 12/1923 | O'Connor | 446/222 |
| 2,396,906 | 3/1946 | Windson | 446/222 |
| 2,524,562 | 10/1950 | Dawbarn | 137/231 |
| 2,779,554 | 1/1957 | Kizzek | 244/31 |
| 2,880,946 | 4/1959 | Froehlich | 244/31 |
| 2,919,082 | 12/1959 | Winzen et al. | 244/31 |
| 3,080,138 | 3/1963 | Church | 244/31 |
| 3,871,422 | 3/1975 | Elson et al. | 446/222 X |
| 4,420,130 | 12/1983 | Regipa | 244/31 |
| 4,737,133 | 4/1988 | Neumeier | 446/222 X |
| 4,828,176 | 5/1989 | Crowe | 446/222 X |

FOREIGN PATENT DOCUMENTS

| | | | |
|---|---|---|---|
| 185290 | 4/1956 | Fed. Rep. of Germany | 446/222 |
| 2476493 | 8/1981 | France | 446/222 |

Primary Examiner—John Rivell
Attorney, Agent, or Firm—Jones & Askew

[57] ABSTRACT

The invention concerns a fastening arrangement between the hose-like neck (11) of a sonde balloon (10) and the closing piece or valve piece (13) of the balloon. The closing piece or valve piece (13) can be fitted inside the hose-like neck (11) of the sonde balloon (10) as gas-tight. The fastening arrangement comprises a fastening ring (12), which can be fitted onto the free mouth part of the neck (11) of the sonde balloon. Hereupon, the outer end (11a) of the mouth part of the neck (11) can be folded outside and over the fastening ring (12) onto the neck part (11) placed on the cylinder part (13b) of the closing or valve piece (13), the neck (11) thereby becoming two-fold. The inner diameter ($D_1$) of the fastening ring (12) has been dimensioned smaller than the diameter ($D_2$) of the cylinder part (13b) of the closing or valve piece (13). In this way, against the end (13a) of the closing or valve piece (13), a gas-tight and mechanically reliable fastening arrangement is obtained which is self-tightening by means of the lifting force of the sonde balloon (10).

7 Claims, 1 Drawing Sheet

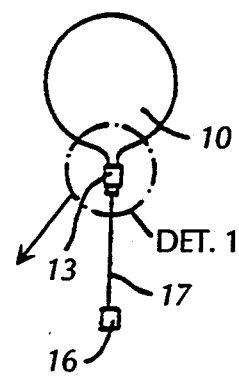
FIG. 1
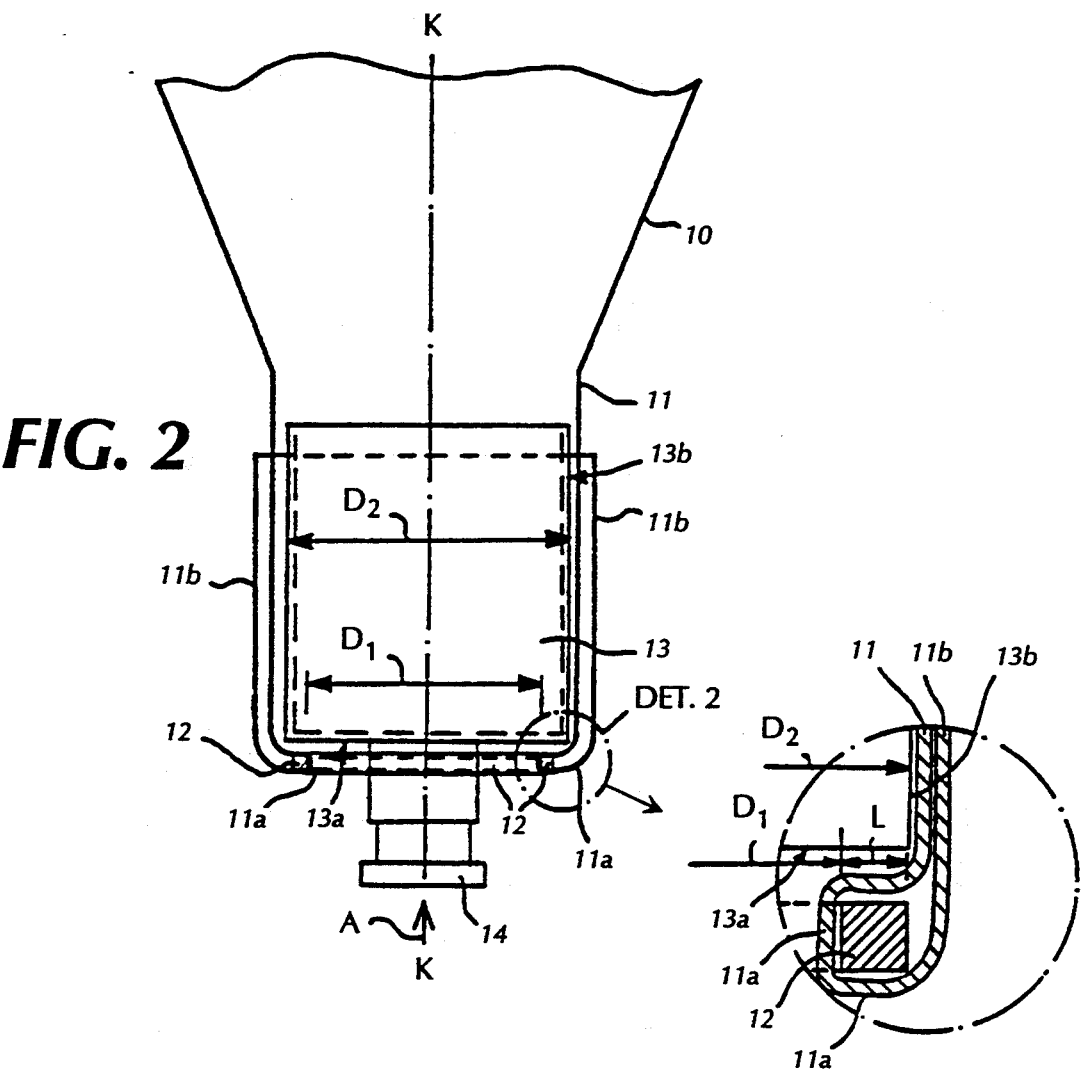
FIG. 2
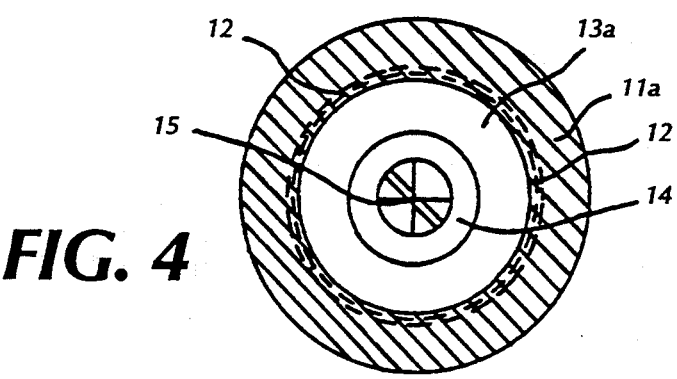
FIG. 4
FIG. 3

FASTENING ARRANGEMENT BETWEEN THE CLOSING PIECE OR VALVE PIECE OF A SONDE BALLOON AND THE NECK OF THE SONDE BALLOON

The invention concerns a fastening arrangement between the hose-like neck of a sonde balloon and the closing piece or valve piece of the balloon, which closing piece or valve piece is fitted inside the neck of the sonde balloon as gas-tight.

In the way known from prior art, for lifting of meteorological or equivalent radiosondes, a large rubber balloon inflated with hydrogen or helium is used. To the mouth part of the neck of this balloon, a closing or valve piece is attached, by whose means the neck is closed and through which the balloon may be inflated with a gas lighter than air. To said closing or valve piece, a radiosonde is attached by means of a cord.

In the way known from prior art, said valve piece comprises a spring-loaded valve disk, which is opened by the tip of the nozzle of the balloon filling apparatus against the spring force when the sonde balloon is inflated with gas. After the filling, the spring of the valve piece, together with the slight pressure present in the balloon, presses the valve disk into a tight closed position.

In the way known from prior art, the mouth part of the hose-like neck of the sonde balloon is attached onto the valve piece, which is shaped as a circular cylinder, and this joint is secured by means of cord loops or by means of a plastic strap that can be tightened. The making of said joint requires extreme care in order that the joint should become reliable both mechanically and in view of gas-tightness. With prior-art applications, the making of this joint reliable requires experience and time, and the tightness of the joint cannot be checked in a simple way.

Since the radiosonde and the related components are disposable, the various parts must be of simple construction and low cost of manufacture, one of the objects of the present invention being to achieve said goal.

The object of the present invention is to provide a novel and simple solution for the problems dealt with above.

In view of achieving the objectives stated above and those that will come out later, the invention is mainly characterized in that the fastening arrangement comprises a fastening ring, which can be fitted onto the free mouth part of the neck of the sonde balloon, whereupon the outer end of the mouth part of the neck can be folded outside and over the fastening ring onto the neck part placed on the cylinder part of the closing or valve piece, the neck thereby becoming two-fold, and that the inner diameter of the fastening ring has been dimensioned smaller than the diameter of the cylinder part of the closing or valve piece, so that, against the end of the closing or valve piece, a gas-tight and mechanically reliable fastening arrangement is obtained which is self-tightening by means of the lifting force of the sonde balloon.

According to the invention, a simple fastening arrangement is provided which can be folded rapidly and by whose means the successful fastening and the tightness and the mechanical reliability of the joint can be checked easily and simply.

According to the invention, a self-tightening fastening arrangement is provided, whose tightening force consists of the lifting force of the sonde balloon and of the force of gravity applied to the sonde.

In the following, the invention will be described in detail with reference to an exemplifying embodiment of the invention illustrated in the figures in the accompanying drawing, the invention being by no means strictly confined to the details of said embodiment.

FIG. 1 is a schematic illustration of a sonde balloon and of a connected radiosonde.

FIG. 2 shows the detail DET.1 of the sonde-balloon neck, indicated in FIG. 1.

FIG. 3 shows the detail DET.2 of the joint in accordance with the invention between the sonde-balloon neck and the valve piece.

FIG. 4 shows the joint between the sonde-balloon neck and the valve piece as viewed from the side of the filling nozzle of the valve piece in the direction of the arrow A indicated in FIG. 2.

FIG. 1 shows the sonde balloon 10, in the interior of whose hose-like neck a valve piece 13 is fixed. The piece 13 has an annular plane end part 13a and a mantle part 13b shaped as a circular cylinder, the mouth part of the hose-like neck 11 of the sonde balloon 10 being fastened onto said cylindrical mantle part. At the end 13a of the piece 13, there is a nozzle part 14, to which the radiosonde 16 is attached by means of a cord 17 in the way shown in FIG. 1. The nozzle part 14 is provided with a spring-loaded valve disk (not shown), through which the sonde balloon 10 is inflated with hydrogen or helium. With respect to the details of the other constructions of the valve piece 13, reference is made to the applicant's FI Patent Application No. 922559, which is filed simultaneously with the present application.

According to the present invention, the hose-like neck 11 of the sonde balloon 10 has been fastened onto the piece 13 by making use of a closed fastening ring 12. The fastening ring 12 is preferably of circular shape and of square section, as comes out best from FIG. 3. The fastening ring 12 is made of metal or plastic, and its structure is solid or braided. It is an important feature of the fastening ring 12 that its inner diameter $D_1$ is smaller than the outer diameter $D_2$ of the cylinder part 13b of the valve piece 13.

According to the invention, the fastening of the valve piece 13 to the hose-like neck 11 of the sonde balloon takes place so that the piece 13 is inserted deep enough into the neck 11, so that the mouth part of the neck 11 remains free. Hereupon the fastening ring 12 is passed onto the mouth part of the neck 11 against the end 13a of the piece 13. Hereupon the free mount portion of the neck 11 of the balloon 10 is stretched and turned onto the cylinder part 13b of the piece 13, whereby the crease part 11a of the neck 11 is turned around the fastening ring 12, and the end 11b of the neck 11 is placed on the neck 11 portion that is placed on the cylinder part 13b, so that the neck 11 is placed as two-fold on the piece 13. In this way, a reliable joint is obtained, which is self-tightening and gas-tight, because, by the effect of the lifting force of the balloon 10, the joint is secured tightly on support of the fastening ring 12 while the neck 11 is pressed tightly against the end part 13a of the valve piece 13.

In FIG. 3, for the sake of clarity, the joint arrangement is shown as slack, but the joint is tightened and remains gas-tight partly because of the tightening force between the lifting force of the sonde balloon 10 and the gravity applied to the sonde 16, which force pulls the hose neck upwards, whereby the fastening ring 12 and the neck portion 11 that has been folded around the fastening ring are secured tightly against the plane end 13a of the piece 13. The joint arrangement is also self-centred, so that the fastening ring 12 is placed coaxially with the centre axis K—K of the piece 13.

By means of a fastening ring 12 fitted in accordance with the invention, a reliable and gas-tight fastening of the neck 11 of a sonde balloon is provided in a simple way even if the neck 11 were fitted on the valve piece 13 rather untightly, in which case the fastening can be carried out quickly.

An example of typical dimensions of the fastening ring 12 is as follows: $D_1 = 32$ mm, $L = 1 \ldots 1.5$ mm, and $D_2 = 35$ mm, in which case the unstretched inner diameter of the neck 11 of the sonde balloon 10 is $\approx 30 \ldots 35$ mm.

In a preferred embodiment of the invention, the outer diameter of the fastening ring 12 is $D_1 + 2L \approx D_2$. Typically, the inner diameter $D_1$ of the fastening ring 12 is approximately $5 \ldots 15\%$ smaller than the outer diameter $D_2$ of the cylinder part 13b of the piece 13.

A fastening in accordance with the invention can also be applied in sonde balloons in which a valve piece proper is not employed, but a corresponding closing piece 13 similar to a plug or to a cork of a bottle, in which there is no valve arrangement.

In the following, the patent claims will be given, and the various details of the invention may show variation within the scope of the inventive idea defined in said claims and differ from what has been stated above for the sake of example only.

I claim:

1. Fastening arrangement between a hose-like neck (11) of a sonde balloon (10) and a cylindrical valve piece (13) of the balloon, which valve piece (13) is fitted inside the hose-like neck (11) of the sonde balloon (10) as gas-tight, comprising:

a fastening ring (12) configured to fit onto a free mouth part of the neck (11) of the sonde balloon, whereupon an outer end (11a) of the mouth part of the neck (11) can be folded outside and over the fastening ring (12) onto a neck part placed on the cylindrical valve piece (13), the neck (11) thereby becoming two-fold; and an inner diameter ($D_1$) of the fastening ring (12) being smaller than a diameter ($D_2$) of the cylindrical valve piece (13), so that, against an outer end (13a) of the valve piece (13), a gas-tight and mechanically reliable fastening arrangement is obtained which is self-tightening by means of the lifting force of the sonde balloon (10).

2. Fastening arrangement as claimed in claim 1, wherein said fastening ring (12) is closed and of circular shape.

3. Fastening arrangement as claimed in claim 1, wherein the cross-sectional shape of the fastening ring (12) is rectangular.

4. Fastening arrangement as claimed in claim 1, wherein the outer end (13a) of said cylindrical valve piece (13) is defined by a planar annular part, in which there is an inflation nozzle (14).

5. Fastening arrangement as claimed in claim 1, wherein the cylindrical valve piece (13) that is placed against the inner face of the hose-like neck (11) of the sonde balloon (10) is shaped as a circular cylinder.

6. Fastening arrangement as claimed in claim 1, wherein the inner diameter ($D_1$) of said fastening ring (12) is substantially 5 to 15% smaller than the outer diameter ($D_2$) of the cylindrical valve piece (13).

7. Fastening arrangement as claimed in claim 1, wherein an outer diameter of the fastening ring (12) is substantially equally large as the diameter ($D_2$) of the cylindrical valve piece (13).

* * * * *